(12) United States Patent
Orange et al.

(10) Patent No.: US 9,409,353 B2
(45) Date of Patent: Aug. 9, 2016

(54) COMPOSITE POLYAMIDE ARTICLE

(75) Inventors: Gilles Orange, Vourles (FR); Roland Durand, Saint Bonnet De Mure (FR); Olivier Gilbain, Mions (FR); Vincent Mollet, Vernaison (FR)

(73) Assignee: RHODIA OPERATIONS, Paris (FR)

( * ) Notice: Subject to any disclaimer, the term of this patent is extended or adjusted under 35 U.S.C. 154(b) by 307 days.

(21) Appl. No.: 13/120,952

(22) PCT Filed: Sep. 24, 2009

(86) PCT No.: PCT/EP2009/062379
§ 371 (c)(1),
(2), (4) Date: Jun. 13, 2011

(87) PCT Pub. No.: WO2010/034771
PCT Pub. Date: Apr. 1, 2010

(65) Prior Publication Data
US 2011/0241249 A1    Oct. 6, 2011

(30) Foreign Application Priority Data
Sep. 26, 2008  (FR) ..................... 08 05299

(51) Int. Cl.
| | | |
|---|---|---|
| B29C 70/48 | (2006.01) | |
| B29C 70/46 | (2006.01) | |
| C08L 5/04 | (2006.01) | |
| D06M 15/59 | (2006.01) | |
| B29C 51/00 | (2006.01) | |
| B29K 77/00 | (2006.01) | |
| B29K 105/06 | (2006.01) | |
| B29L 31/00 | (2006.01) | |

(52) U.S. Cl.
CPC .............. *B29C 70/48* (2013.01); *B29C 70/465* (2013.01); *C08L 5/04* (2013.01); *D06M 15/59* (2013.01); *B29C 51/002* (2013.01); *B29K 2077/00* (2013.01); *B29K 2105/06* (2013.01); *B29L 2031/726* (2013.01); *C08J 2377/00* (2013.01)

(58) Field of Classification Search
CPC ....................................... B29C 70/48
USPC ....................................... 264/257
See application file for complete search history.

(56) References Cited

U.S. PATENT DOCUMENTS 3,920,879 A * 11/1975 Segal et al. ............... 428/474.9
8,097,684 B2    1/2012 Clement et al.

FOREIGN PATENT DOCUMENTS

FR       2856693 A    12/2004
WO     03014198 A     2/2003

OTHER PUBLICATIONS

International Search Report dated Nov. 3, 2009 in International Application No. PCT/EP2009/062379.
English language machine translation of WO 2003/014198.

* cited by examiner

*Primary Examiner* — Larry Thrower

(57) ABSTRACT

Uses of low molecular mass, non-evolutive polyamide resins for making composite articles are described. Articles obtained from such resins having good mechanical properties, such as rigidity, breaking load, impact resistance, and fatigue behavior in particular, even when the articles are manufactured according to cycles shorter than those usually used, and without any processing before or after the manufacture of the composite articles, are also described.

11 Claims, No Drawings

COMPOSITE POLYAMIDE ARTICLE

This application is the United States national phase of PCT/EP2009/062379, filed Sep. 24, 2009, and designating the United States (published in the French language on Apr. 1, 2010, as WO 2010/034771 A1; the title and abstract were also published in French), which claims foreign priority under 35 U.S.C. §119 of FR 0805299, filed Sep. 26, 2008, each hereby expressly incorporated by reference in its entirety and each assigned to the assignee hereof.

The present invention relates to the use of low-molecular-weight, non-evolutive polyamide resins for manufacturing composite articles. Said articles have good mechanical properties, such as, in particular, rigidity, breaking strength, impact resistance and fatigue behavior, even when they are manufactured according to cycle times that are shorter than those normally used, and without any other processing during or after the manufacture of the composite articles.

PRIOR ART

In the field of high-performance materials, composite articles have assumed a dominant position because of their performance and the savings in weight which they allow. The currently most well known high-performance composite articles are obtained from thermosetting resins, use of which is limited to small-scale to moderate-scale applications, mainly in aeronautics or motorsports, and in the best cases, which exhibit manufacturing times in the region of approximately 15 minutes, such as, for example, during the manufacture of skis. The cost of these materials and/or the manufacturing times make it difficult to render them compatible with use in mass production. Furthermore, the use of thermosetting resins often involves the presence of solvents and of monomers. Finally, these composites are difficult to recycle.

One response, in regard to the manufacturing times, is given by composites comprising a thermoplastic matrix. Thermoplastic polymers are generally known for their high viscosity, which constitutes a check as regards the impregnation of reinforcing materials, generally composed of very dense multifilament bundles. The use of the thermoplastic matrices available on the market results in a difficulty in impregnation, requiring either prolonged impregnation times or significant processing pressures. In the majority of cases, the composite materials obtained from these matrices may exhibit defects, in particular in the form of micro-spaces and unimpregnated regions. These defects are responsible for declines in mechanical properties, premature aging of the material and also problems of delamination when the material is composed of several reinforcing layers. This phenomenon of loss of mechanical properties is, moreover, accentuated when the cycle times for the manufacture of the composite articles decrease.

In order to overcome these problems of impregnation difficulties due to the high viscosity of thermoplastic polymers in the molten state, it has been proposed to use monomers or else prepolymers which have a low weight-average molecular weight Mw. The low melt viscosity of these systems then allows good impregnation of the reinforcing cloth. However, the infiltrated prepolymer has a certain instability owing to its reactivity since it has not been polymerized to reach its thermodynamic equilibrium. Moreover, with the aim of increasing the mechanical performance desired, it is necessary to increase the molecular weight of the prepolymer, in particular by performing longer manufacturing cycles for the composite article or involving a specific post-manufacture processing step. To do this, it is sometimes necessary to use particular process conditions due to the presence of catalysts and control of effluents. According to the systems, it may also be necessary to eliminate the residual monomers, sometimes in high content, which have not completely reacted during this step.

The objective of the present invention is therefore to overcome these drawbacks by providing a composite article which can be manufactured with short cycle times, without any particular processing or post-processing, and which does not exhibit any residual monomers, while at the same time having good use properties such as high-performance mechanical properties.

INVENTION

The applicant has discovered, unexpectedly, that the use of polyamides in the form of low-molecular-weight, non-evolutive resins for the manufacture of composite articles makes it possible to obtain articles having good mechanical properties, such as, in particular, rigidity, breaking strength, impact resistance and fatigue behavior, even when they are manufactured according to cycle times shorter than those that are normally used, and without any other processing during or after the manufacture of the composite articles. This makes it possible to provide a composite material exhibiting an advantage of reduction in manufacturing costs, through the use of equipment employing shortened cycle times. Moreover, the polyamide resins according to the invention are simple to manufacture, in particular by polymerization until thermodynamic equilibrium is reached.

It has been observed that the molecular weights of the polyamide resins under consideration do not change during the manufacturing process for these composite components. Thus, composites with high mechanical performance are obtained entirely surprisingly, although the polymeric matrix does not in itself exhibit high mechanical performance owing to the fact that its molecular weight is too low.

Low-molecular-weight non-evolutive polyamide resins can be obtained in various ways, in particular by taking the compositions off equilibrium and/or adding blocking components during the polyamide polymerization or polycondensation process; or else be adding compounds in a mixture, in particular in extrusion.

These resins are termed non-evolutive insofar as no significant increase in molecular weight, or in degree of polymerization, is observed when they are used in the process for manufacturing a composite article; i.e. under temperature and pressure conditions that normally promote an increase in molecular weight. These resins are, in this sense, different than the partially polymerized polymers or prepolymers conventionally used.

Thus, regardless of the conditions for using the resin according to the invention during the manufacture of composite articles, in particular the cycle times, the temperatures and pressures and the usual water content ranges, said articles exhibit good, stable, controlled and reproducible mechanical properties.

The articles according to the invention exhibit in particular the advantages of rigidity, strength, lightness and ability to be recycled and a good surface appearance.

A first subject of the invention is a process for the manufacture of a composite article by molding, comprising at least the following steps:
a) a step of impregnating at least one reinforcing cloth with a composition comprising a polyamide resin in the molten state, said resin having a weight-average molecular weight Mw of between 5000 and 25 000 g/mol and a concentration of amine terminal groups (ATG) or of carboxylic terminal groups (CTG) of less than or equal to 20 meq/kg; and b) a step of cooling and then recovering the composite article.

The present invention also relates to the use of a composition comprising a polyamide resin in the molten state, said resin having a weight-average molecular weight Mw of between 5000 and 25 000 g/mol and a concentration of amine terminal groups (ATG) or of carboxylic terminal groups (CTG) of less than or equal to 20 meq/kg, for the manufacture of a composite article, in particular comprising at least one reinforcing cloth.

The term "composite article" is in particular intended to mean according to the invention a material comprising a framework called a reinforcement which provides the mechanical strength and a thermoplastic matrix which provides the cohesion of the structure and retransmits the stresses to the reinforcement.

The term "cloth" is intended to mean a textile surface obtained by assembling yarns or fibers which are rendered integral by any process, such as, in particular, adhesive bonding, felting, braiding, weaving or knitting. These cloths are also denoted as fibrous or filamentary networks. The term "yarn" is intended to mean a monofilament, a continuous multifilament yarn or a staple-fiber yarn obtained from fibers of a single type or from several types of fibers as an intimate mixture. The continuous yarn can also be obtained by assembling several multifilament yarns. The term "fiber" is intended to mean a filament or a set of filaments which are cut, cracked or converted.

The reinforcing cloth preferably comprises reinforcing yarns and/or fibers selected from yarns and/or fibers of carbon, glass, aramids, polyimides, flax, hemp, sisal, coir, jute, kenaf and/or mixtures thereof. More preferably, the reinforcing cloths consist solely of reinforcing yarns and/or fibers selected from yarns and/or fibers of carbon, glass, aramids, polyimides, flax, hemp, sisal, coir, jute, kenaf and/or mixtures thereof.

These cloths preferably have a grammage, i.e. the weight per square meter, of between 100 and 1000 g/m$^2$.

Their structure may be random (mat), unidirectional (UD), or more or less equilibrated multidirectional (2D, 2.5D, 3D, or the like).

The polyamides can be selected from the group consisting of polyamides obtained by polycondensation of at least one linear aliphatic dicarboxylic acid with an aliphatic or cyclic diamine, or between at least one aromatic dicarboxylic acid and an aliphatic or aromatic diamine, polyamides obtained by polycondensation of at least one amino acid or lactam with itself, or blends and (co)polyamides thereof. Semicrystalline polyamides are particularly preferred. Linear polyamides are also preferred.

The polyamide of the invention is in particular selected from the group consisting of polyamides obtained by polycondensation of at least one aliphatic dicarboxylic acid with an aliphatic or cyclic diamine, such as PA 6.6, PA 6.10, PA 6.12, PA 12.12, PA 4.6 or MXD 6, or between at least one aromatic dicarboxylic acid and an aliphatic or aromatic diamine, such as polyterephthalamides, polyisophthalamides, polyaramids, or blends and (co)polyamides thereof. The polyamide of the invention can also be selected from polyamides obtained by polycondensation of at least one amino acid or lactam with itself, it being possible for the amino acid to be generated by the hydrolytic opening of a lactam ring, such as, for example, PA 6, PA 7, PA 11 or PA 12 or blends and (co)polyamides thereof.

The polymerization of the polyamide of the invention is in particular carried out according to conventional operating conditions for polyamide polymerization, continuously or batchwise.

The polyamide resins according to the invention have a concentration of amine terminal groups (ATG) or of carboxylic terminal groups (CTG) of less than or equal to 20 meq/kg, preferably less than or equal to 15 meq/kg, more preferably less than or equal to 10 meq/kg, even more preferably less than or equal to 5 meq/kg, and most particularly equal to 0 meq/kg.

A polyamide suitable for the present invention can thus have, for example, an ATG of 0 meq/kg and a CTG of 500 meq/kg. A polyamide suitable for the present invention can thus have, for example, an ATG of 400 meq/kg and a CTG of 0 meq/kg. A polyamide having a concentration of amine terminal groups (ATG) of less than or equal to 5 meq/kg generally has a concentration of carboxylic terminal groups (CTG) of between 100 and 1000 meq/kg. A polyamide having a concentration of carboxylic terminal groups (CTG) of less than or equal to 5 meq/kg generally has a concentration of amine terminal groups (ATG) of between 100 and 1000 meq/kg.

The amounts of amine terminal groups (ATG) and/or acid terminal groups (CTG) can be determined by potentio-metric assay after complete dissolution of the polyamide, for example in trifluoroethanol, and addition of an excess amount of strong base. The basic species are then titrated with an aqueous solution of strong acid.

Such resins according to the invention can be produced in many ways and are well known per se to those skilled in the art.

Such resins can, for example, be produced by addition in polymerization, in particular at the beginning, during or at the end of the polymerization, of the monomers of the polyamide, also in the presence of difunctional and/or monofunctional compounds. These difunctional and/or monofunctional compounds have amine or carboxylic acid functions capable of reacting with the monomers of the polyamide and are used in proportions such that the resulting polyamide resin has an ATG or a CTG of less than 20 meq/kg.

In order to obtain resins according to the invention by polymerization, it is in particular possible to use the relationship $DPn=(1+r)/(1+r-2pr)$ in which DPn is the degree of polymerization of the resin, r is the ratio of ATG/CTG or CTG/ATG, of less than 1, introduced during the polymerization and p corresponds to the progression of the reaction.

It is also possible to mix difunctional and/or monofunctional compounds with a polyamide, in particular by extrusion, generally a reactive extrusion, so as to obtain the polyamide resin used according to the present invention.

Aliphatic or aromatic, monocarboxylic or dicarboxylic acids of any type or aliphatic or aromatic monoamines or diamines of any type may be used. It is in particular possible to use n-dodecylamine and 4-amino-2,2,6,6-tetramethylpiperidine, acetic acid, lauric acid, benzylamine, benzoic acid and propionic acid as monofunctional compound. It is in particular possible to use adipic acid, terephthalic acid, isophthalic acid, sebacic acid, azelaic acid, dodecanedioic acid, decanedioic acid, pimelic acid, suberic acid, dimer fatty acids, di(β-ethylcarboxy)cyclohexanone, hexamethylenediamine, 5-methyl pentamethylenediamine, metaxylylenediamine, butanediamine, isophorone diamine, 1,4-diaminocyclohexane and 3,3',5-trimethylhexameth-ylenediamine as difunctional compound.

It is also possible to use an excess of adipic acid or an excess of hexamethylenediamine for the production of a polyamide type 66 having a high melt flow and a concentration of amine terminal groups (ATG) or of carboxylic terminal groups (CTG) of less than 20 meq/kg.

It is also possible to greatly reduce the concentrations of acid or amine terminal groups of a polyamide by performing finishing under vacuum at the end of polymerization in such a way as to eliminate the water in order to consume all or virtually all the terminal groups, and thus guarantee that the resin will no longer change in terms of an increase in the molar mass regardless of the conditions for using the composite, in particular under pressure or under vacuum.

The weight-average molecular weight Mw of the polyamide resins is between 5000 and 25 000 g/mol, preferably between 10 000 and 15 000 g/mol. This weight undergoes virtually no change during the process for the manufacture of the composite articles due to the absence or virtual absence of acid or amine terminal groups. The weight-average molecular weight can be measured by size exclusion chromatography SEC or GC analysis of the polyamide in dichloromethane after hydrolysis of the amide functions with trifluoroacetic anhydride. The absolute weight distributions are obtained by viscometric detection.

The polyamide according to the invention in the form of a non-evolutive resin advantageously has a melt viscosity $\eta$ of less than or equal to 40 Pa·s, preferably less than or equal to 20 Pa·s. This viscosity can be measured using a plate-plate rheometer of 50 mm diameter, under a stepwise shear sweep ranging from 1 to 160 $s^{-1}$. The polymer is in the form of granules, or else in the form of a film with a thickness of 150 µm. The polymer is brought to a temperature of 25 to 30° C. above its melting point and the measurement is then carried out.

The step of impregnating the polyamide resin and the reinforcing cloth can be carried out in various ways, according to various possible processes. It is perfectly possible to carry out the impregnation of one or more reinforcing cloth(s).

The impregnation of the reinforcing cloth with the polyamide composition can in particular be carried out by bringing the polyamide composition in the molten state into contact, in particular by injection, with the reinforcing cloth, it being possible for this cloth to be located in a mold. The impregnation can also be carried out by bringing the reinforcing cloth into contact with the polyamide composition in the form of a powder or a film, and then melting said polyamide composition.

It is possible, for example, to inject the molten polyamide resin into a molding chamber comprising at least one or more reinforcing cloths. The interior of the molding chamber may be at a temperature of plus or minus 50° C. with respect to the melting point of said polyamide. After impregnation, it is possible subsequently to cool the molding chamber and the article obtained, in order finally to recover said article. This process is also known under the name of resin transfer molding (RTM) process as a thermoset process, which consists in injecting resin into a closed mold in which reinforcing fibers have been placed beforehand. This process can be carried out under pressure.

It is also possible to produce a composite article according to the invention by means of a process of bringing one or more reinforcing cloths into contact with powder of a polyamide resin as defined above, in particular fine powder obtained by milling, and said impregnation is carried out by melting the polyamide, at a temperature greater than or equal to the melting point of the polyamide, optionally under pressure.

The composite article according to the invention can also be produced by temperature compression of a stack of reinforcing cloths and of polyamide resin films: film stacking process. One or more reinforcing cloths and one or more films of high-flow polyamide are brought into contact and the cloths are impregnated by melting the polyamide. The pressures necessary for good assembling are generally greater than a few bar.

After impregnation of the reinforcing cloth with the polyamide resin, the article is obtained by solidifying the matrix. Cooling can advantageously be carried out rapidly, so as to prevent excessive crystallization of the polyamide, in particular in order to maintain the properties of the article. Cooling can in particular be carried out in less than 5 minutes, more preferably in less than one minute. The mold can, for example, be cooled by a circuit of cold fluid. It is also optionally possible to transfer the composite article into a cold mold, optionally under pressure.

The polyamide composition and/or the composite article according to the invention can also comprise all the additives normally used in polyamide-based compositions used for the manufacture of articles. Thus, mention may be made, by way of example of additives, of heat stabilizers, UV stabilizers, antioxidants, lubricants, pigments, dyes, plasticizers, reinforcing fillers and agents which modify impact resistance. These additives can be incorporated during the synthesis of the resin or else by addition to the powders or films or at melting during infiltration.

Additives for improving the quality of the reinforcing cloth/polyamide interfaces can also be used. These additives can, for example, be incorporated into the polyamide composition, be incorporated into the yarns and/or fibers of the reinforcing cloth, be present on the yarns and/or fibers of said cloth, or else be deposited onto the reinforcing cloth. These additives can be coupling agents, such as those of aminosilane or chlorosilane type (in particular in the case of glass cloth) or else liquefying or wetting agents, or a combination thereof.

Reinforcing fillers can be incorporated into the polyamide composition. These fillers can be selected from fibrous fillers, such as short glass fibers, for example, or nonfibrous fillers, such as kaolin, talc, silica, mica or wollastonite. Their size is generally between 1 and 50 µm. Submicronic or even nanometric fillers can also be used, alone or as a supplement to the other fillers.

The present invention also relates to an article that can be obtained by means of the process of the invention.

The articles according to the invention preferably comprise between 25% and 70% by volume of reinforcing cloth, relative to the total volume of the article.

The articles of the invention can be finished or semi-finished articles which can be referred to as pre-impregnated articles. The presence of non-evolutive resin can be particularly advantageous in this case since the good flow used during the manufacture of the semi-finished articles is in fact preserved during the final forming for producing the finished articles. It is possible, for example, to carry out the thermoforming of the composite articles in the form of sheets in order to give them a defined shape after cooling. The invention thus relates to composite articles or preforms that can be obtained by means of the process according to the present invention.

The articles of the invention can also be structures of sandwich type exhibiting a core, generally of low density, inserted between two external layers (skins). The composites of the invention can be used to form the external layers by combining them with a core of honeycomb type or foam type. The layers can be assembled by chemical or heat bonding or else any other process.

The composite structures according to the invention can be used in numerous fields, such as the aeronautical, motor vehicle, and more generally transport, electrical or sports and leisure industries. These structures can be used to produce sports equipment, such as skis, or else to produce various surfaces, such as special floors, partitions, vehicle bodies, or billboards. In the aeronautical industry, these structures are used in particular for fairings (fuselage, wing, tailplane). In the motor vehicle industry, they are used, for example, for floors or supports, such as parcel shelves.

A specific language is used in the description so as to facilitate understanding of the principle of the invention. Nevertheless, it should be understood that no limitation on the scope of the invention is envisioned by the use of this specific language.

Modifications, improvements and perfectings can in particular be envisioned by a person conversant with the technical field concerned on the basis of their own general knowledge.

The term "and/or" includes the meanings and, or and also all the other possible combinations of the elements connected to this term.

Other details or advantages of the invention will become more clearly apparent in the light of the examples given below purely by way of indication.

EXPERIMENTAL SECTION

Various polyamide resins were used in this experimental section and are mentioned in table 1.

PA C1 (comparative): standard linear polyamide 6 having a viscosity number VN of 115 (ISO 307 in formic acid) and a Mw of 33 000 g/mol.

PA C2 (comparative): standard linear polyamide 6.6 having a viscosity number VN of 130 and a Mw of 33 000 g/mol.

PA C3 (comparative): polyamide 6.6 having an initial VN of 59, a Mw of 15 500 g/mol and an ATG content equal to 130 meq/kg and a CTG content equal to 160 meq/kg.

PA 1: polyamide 6.6 obtained by polymerization addition of adipic acid having a VN of 40, a Mw of 11 000 g/mol, an ATG content equal to 0 meq/kg and a CTG content equal to 445 meq/kg.

PA 2: polyamide 6.6 obtained by polymerization addition of adipic acid having a VN of 47, a Mw of 12 700 g/mol, an ATG content equal to 0 meq/kg and a CTG content equal to 354 meq/kg.

The polyamides PA 1 and PA 2 are synthesized according to a standard process for the synthesis of polyamide 66, followed by a finishing step under vacuum lasting 10 minutes. The molten product is then extruded via the pouring valve and collected on a metal sheet on which it crystallizes. The crystallized polyamides are ground so as to finally obtain a ready-to-use powder.

The reinforcements used in the examples are in the form of preforms made of glass fabrics cut to the dimensions required for the manufacture of sheets, i.e. 150×150 mm. The reinforcing cloth used is a fabric made of glass)(0°-90°) fiber from Synteen & Luckenhaus resulting from a roving of 1200 tex, exhibiting a grammage of 600 g/m$^2$.

Example 1

Preparation of the Composite Articles

The composite components are prepared by means of a Schwabenthan hydraulic press comprising two temperature-controlled plates (Polystat 300A): heating plates (heating resistances), and cooled plates (circulation of water). A metal mold having a cavity with dimensions of 150 mm×150 mm is used.

In order to produce a composite containing 80% by weight of glass fibers with the fabric with a grammage of 600 g/m$^2$, a preform composed of an alternating stack comprising, in total, 6 sheets of glass fabrics is introduced into the mold. Polyamide powder is located between each sheet of fabrics.

The temperature of the plates of the press is raised beforehand to 290° C. before the introduction of the preform. At this temperature, the pressure is applied and maintained at a nominal value; ventings are rapidly carried out. The mold is then transferred onto the device comprising cooled plates and is maintained under pressure. Various types of cycle were used: high and medium pressure, short and long times.

Two types of cycles were carried out: a cycle of 5 min at 70 bar (cycle 1), and a cycle of 5 min at 15.5 bar (cycle 2). These times correspond to the total duration of the cycle between bringing the mold to temperature and cooling under pressure.

Example 2

Characterization of the Composite Articles

The 150×150 mm sheets are cut up in order to obtain samples of dimensions of 150×20×2 mm. A conditioning treatment is then carried out according to the standard ISO 1110 "Plastics-Polyamides-Accelerated conditioning of test specimens". The water content at equilibrium is obtained by conditioning the composite components with a cycle of 11 days at 70° C. under a residual humidity RH of 62%.

The mechanical properties were obtained at 23° C., and humidity RH=50% (stabilization of the test specimens for 48 h at 23° C., RH=50%).

The 3-point bending tests at ambient temperature are carried out on parallelepipedal test specimens (150×20×2 mm), according to the standard ISO No. 14125, on a Zwick 1478 machine: distance between rods of 64 mm, crosshead velocity of 5 mm/min. The values for Young's elastic modulus E (GPa) and for max stress σ at peak (MPa) are measured and calculated.

The polyamide resins were characterized by measurements of viscosity number (VN) and of molecular weight by GC: Mn, Mw and Mz. The molecular weight measurements were carried out before and after production of the composite objects.

The results are expressed in table 1 below:

TABLE 1

| | POLYAMIDE | | | | COMPOSITE | | | |
| | | | | | CYCLE 1 | | CYCLE 2 | |
| Polyamide used | Mw (g/mol) | ATG (meq/kg) | CTG (meq/kg) | Mw | Elastic modulus E (GPa) | Max stress σ (MPa) | Elastic modulus E (GPa) | Max stress σ (MPa) |
|---|---|---|---|---|---|---|---|---|
| C1 | 33000 | nm | nm | 33000 | 25 | 550 | 15 | 200 |
| C2 | 33000 | nm | nm | 33000 | 27 | 600 | 24 | 450 |
| C3 | 15500 | 130 | 160 | 21000 | 26.5 | 595 | 26.5 | 585 |

TABLE 1-continued

| | POLYAMIDE | | | COMPOSITE | | | | |
| | | | | | CYCLE 1 | | CYCLE 2 | |
| Polyamide used | Mw (g/mol) | ATG (meq/kg) | CTG (meq/kg) | Mw | Elastic modulus E (GPa) | Max stress σ (MPa) | Elastic modulus E (GPa) | Max stress σ (MPa) |
|---|---|---|---|---|---|---|---|---|
| 1 | 11000 | 0 | 445 | 10100 | 27 | 500 | nm | nm |
| 2 | 12700 | 0 | 354 | 11900 | 27 | 600 | 27 | 500 | nm = not measured

The production of composite articles having good mechanical properties using the polyamides according to the invention is thus observed, particularly by carrying out manufacturing cycles which are not very restrictive, such as cycle 2, in comparison with conventional polyamides of the prior art (C1 and C2). Moreover, the polyamides of the invention exhibit a very good surface appearance and are incomparably easy to use, due to their low melt viscosity in comparison with the polyamides C1 and C2.

Furthermore, it is observed that the articles according to the invention exhibit an excellent compromise between mechanical properties and melt flow in comparison with articles obtained by using evolutive prepolymers (C3).

Moreover, it appears that the prepolymer C3 exhibits instability due to its reactivity, since it was not polymerized until reaching its thermodynamic equilibrium. It is also difficult to produce for the same reason. It also appears, during the test, that, depending on the conditions under which the composite article using the prepolymer C3 is employed, the mechanical properties thereof can vary greatly due to this instability.

The invention claimed is:

1. A process for the manufacture of a composite article by molding, the process comprising at least the following steps:
   a) obtaining a composition comprising a non-evolutive polyamide resin having a weight-average molecular weight Mw of between 5000 g/mol and 25000 g/mol and a concentration of amine terminal groups (ATG) of less than or equal to 5 meq/kg and a concentration of carboxylic terminal groups (CTG) of between 100 and 1000 meq/kg, or a concentration of carboxylic terminal groups (CTG) of less than or equal to 5 meq/kg and a concentration of amine terminal groups (ATG) of between 100 and 1000 meq/kg,
   b) impregnating at least one reinforcing cloth with the composition comprising the non-evolutive polyamide resin in a molten state; and
   c) cooling and then recovering the composite article,
wherein the polyamide has been subjected to a finishing step under vacuum, and
wherein the molecular weight of the non-evolutive polyamide resin does not change during the manufacture of the composite article.

2. The process as claimed in claim 1, wherein the polyamide is selected from the group consisting of polyamides obtained by polycondensation of at least one linear aliphatic dicarboxylic acid with an aliphatic or cyclic diamine, or between at least one aromatic dicarboxylic acid and an aliphatic or aromatic diamine, polyamides obtained by polycondensation of at least one amino acid or lactam with itself, blends thereof, and (co)polyamides thereof.

3. The process as claimed in claim 1, wherein the polyamide resin has a weight-average molecular weight Mw of between 10000 g/mol and 15000 g/mol.

4. The process as claimed in claim 1, wherein the impregnation of the reinforcing cloth with the polyamide composition is carried out by bringing the polyamide composition in the molten state into contact with the reinforcing cloth.

5. The process as claimed in claim 1, wherein the impregnation of the reinforcing cloth with the polyamide composition is carried out by bringing the reinforcing cloth into contact with the polyamide composition in the form of a powder or of a film and then melting said polyamide composition.

6. The process as claimed in claim 1, wherein the article comprises between 25% and 70% by volume of reinforcing cloth, relative to the total volume of the article.

7. The process as claimed in claim 1, wherein the reinforcing cloth comprises reinforcing yarns and/or fibers selected from the group consisting of yarns and/or fibers of carbon, glass, aramids, polyimides, flax, hemp, sisal, coir, jute, kenaf and mixtures thereof.

8. The process according to claim 1, wherein the polyamide is selected from the group consisting of PA 6.6, PA 6.10, PA 6.12, PA 12.12, PA 4.6 and MXD 6.

9. The process according to claim 8, wherein the polyamide is PA 6.6.

10. The process according to claim 1, wherein the concentration of amine terminal groups (ATG) is less than or equal to 5 meq/kg and the concentration of carboxylic terminal groups (CTG) is between 100 and 1000 meq/kg.

11. The process according to claim 10, wherein the concentration of amine terminal groups (ATG) is 0 meq/kg.

* * * * *